United States Patent
Kopetz

(10) Patent No.: US 10,394,671 B2
(45) Date of Patent: Aug. 27, 2019

(54) FAULT-TOLERANT, SERVICEABLE AUTOMATION SYSTEM

(71) Applicant: FTS COMPUTERTECHNIK GMBH, Vienna (AT)

(72) Inventor: Hermann Kopetz, Baden (AT)

(73) Assignee: TTTech Computertechnik AG, Vienna (AT)

( * ) Notice: Subject to any disclaimer, the term of this patent is extended or adjusted under 35 U.S.C. 154(b) by 196 days.

(21) Appl. No.: 15/327,141

(22) PCT Filed: Jul. 17, 2015

(86) PCT No.: PCT/AT2015/050170
§ 371 (c)(1),
(2) Date: Feb. 25, 2017

(87) PCT Pub. No.: WO2016/011469
PCT Pub. Date: Jan. 28, 2016

(65) Prior Publication Data
US 2017/0192417 A1    Jul. 6, 2017

(30) Foreign Application Priority Data
Jul. 22, 2014 (AT) .............................. A 50506/2014

(51) Int. Cl.
*G06F 11/00* (2006.01)
*G06F 11/20* (2006.01)
(Continued)

(52) U.S. Cl.
CPC ........ *G06F 11/2038* (2013.01); *G05B 19/042* (2013.01); *G05B 23/0289* (2013.01); *G05B 23/0294* (2013.01)

(58) Field of Classification Search
CPC ......... H04L 2012/2841; H04L 12/2803; G06F 11/14; G06F 11/1441; G06F 11/1458;
(Continued)

(56) References Cited

U.S. PATENT DOCUMENTS 5,694,542 A * 12/1997 Kopetz ................... G06F 11/10
714/47.1
6,272,386 B1    8/2001 McLaughlin
(Continued)

OTHER PUBLICATIONS

Kopetz et al., "The Time-Triggered Architecture", Proceedings of the IEEE, vol. 91, No. 1, Jan. 2003, pp. 112-126 (Year: 2003).*
(Continued)

*Primary Examiner* — Michael Maskulinski
(74) *Attorney, Agent, or Firm* — Eversheds Sutherland (US) LLP

(57) ABSTRACT

The invention relates to a fault-tolerant, maintainable automation system comprising two central computers, a process periphery and gateway computers, wherein the central computers and the gateway computers are fail-silent FCUs and represent autonomous exchange units, and the central computers and gateway computers exchange timed status messages via communications channels, and wherein each gateway computer establishes the link to the process periphery associated with the gateway computer and saves the current status of the process periphery associated with the gateway computer, and wherein a central computer assumes the role of an active central computer and another central computer assumes the role of a passive central computer, and wherein the active central computer exerts control over the gateway computers, and wherein the active central computer transmits a sign-of-life message to the passive central computer, preferably periodically, and wherein the passive central computer acknowledges the receipt of a sign-of-life message from the active central computer in a periodic sign-of-life
(Continued)

Figure 1:
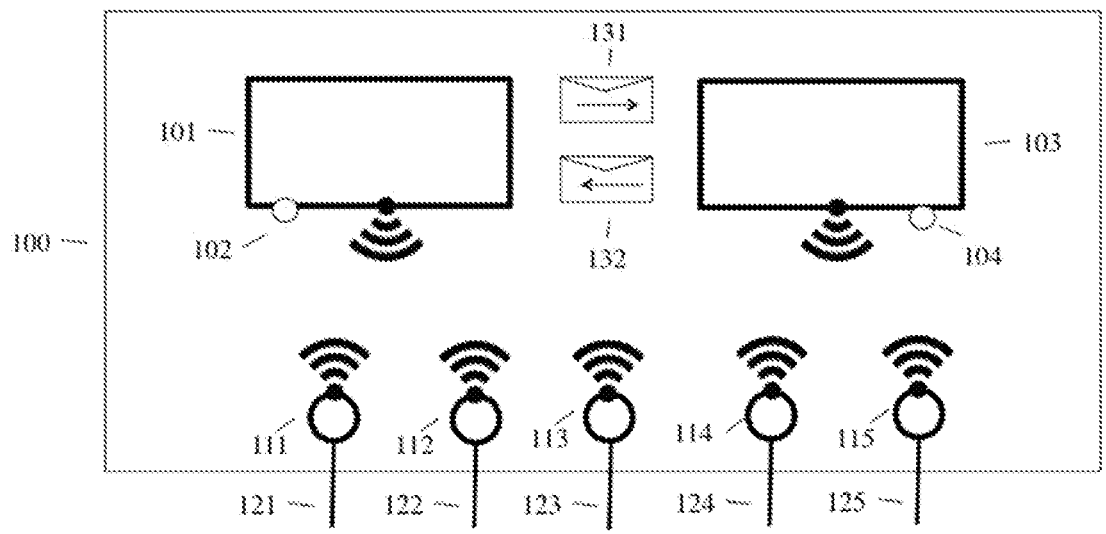

message and monitors it through a time-out, and wherein the passive central computer assumes the role of the active central computer if the sign-of-life messages fail to appear after the time-out, and wherein the faulty, previously active central computer autonomously attempts to restart and, following a successful restart, monitors the communications traffic within a cluster, the cluster containing the central computer, in order to ascertain the current status of the cluster, and wherein the computer assumes the role of the passive central computer and informs the now-active central computer by means of preferably periodic sign-of-life messages that it is performing the role of the passive central computer, and wherein, if the restart is unsuccessful, the faulty central computer indicates the permanent error by means of a display means.

34 Claims, 1 Drawing Sheet

(51) Int. Cl.
  *G05B 19/042* (2006.01)
  *G05B 23/02* (2006.01)
(58) Field of Classification Search
  CPC ...... G06F 11/181; G06F 11/20; G06F 11/202; G06F 11/2023; G06F 11/2028; G06F 11/2033; G06F 11/2038; G06F 11/2048; G06F 11/3024; G05B 23/0289; G05B 23/0259–0297; G05B 19/042; G05B 19/058
  See application file for complete search history.

(56) References Cited

U.S. PATENT DOCUMENTS

| | | | |
|---|---|---|---|
| 6,574,234 B1 * | 6/2003 | Myer | H04L 12/2803 370/438 |
| 8,312,318 B2 | 11/2012 | Graham et al. | |
| 8,745,467 B2 | 6/2014 | Graham et al. | |
| 2003/0135790 A1 | 7/2003 | Pignol | |
| 2006/0162986 A1 * | 7/2006 | Disser | B60T 8/885 180/402 |
| 2016/0306720 A1 * | 10/2016 | Fuhrman | G06F 11/2028 |
| 2017/0116094 A1 * | 4/2017 | Zhang | G06F 11/2028 |
| 2017/0257226 A1 * | 9/2017 | Bi | H04L 43/10 |
| 2017/0277607 A1 * | 9/2017 | Samii | G06F 11/1658 |

OTHER PUBLICATIONS

PCT/AT2015/050170, Chapter I Report, Jan. 24, 2017 (Year: 2017).*
International Search Report issued in PCT/AT2015/050170, dated Nov. 2, 2015, 2 pages.
Written Opinion issued in PCT/AT2015/050170, 5 pages.
Mahmud, A.: Concurrent Error Detection Using Watchdog Processors—A Survey. IEEE Trans. on Computers. vol. 37. No. 2, Feb. 1988.
Kopetz, H. Real-Time Systems, Design Principles for Distributed Embedded Applications. Springer Verlag. 2011, pp. 84-91.

* cited by examiner

FAULT-TOLERANT, SERVICEABLE AUTOMATION SYSTEM

The invention relates to a fault-tolerant, maintainable automation system comprising at least two central computers and a process periphery that is preferably remote, wherein the central computers are configured to communicate with the process periphery and/or control it.

The invention further relates to a fault-tolerant, maintainable automation system comprising at least two central computers and a process periphery that is preferably remote as well as one or more gateway computers, in particular a multitude of gateway computers.

The continuously improving price/performance ratio of computer hardware and the advancement of communications technology has led to the vision of the Internet of Things (IoT), which assumes that a multitude of technical devices can be cost-effectively connected to the Internet and that new fields of application can be opened up and significant societal benefits can be realized as a result of direct communication among these devices. Examples of such new fields of application include the continuous monitoring of patients' medical conditions in the home or in a hospital intensive care unit and the field of automation and energy management in a household.

In addition to the high degree of reliability required and the initial acquisition costs of the computer system, the expense of maintenance once an error occurs is of particular importance in these new fields of application. In many cases, the costs associated with fault diagnostics and repair by a specialist are comparably high or higher than the original acquisition costs of the faulty computer hardware.

The problem addressed by the invention is that of indicating a fault-tolerant, distributed automation system that is distinguished by particularly good maintainability.

This problem is solved by the aforementioned automation system in that, according to the invention,
the central computers are fail-silent FCUs and represent autonomous exchange units,
    wherein one of the at least two central computers assumes the role of an active central computer and at least one other central computer of the at least two central computers assumes the role of a passive central computer,
    and wherein the active central computer carries out communications with the process periphery and/or the control of the process periphery,
    wherein the active central computer and the process periphery exchange timed status messages via communication channels, preferably via wireless and in particular local wireless communication channels, and at least the active central computer saves the current status of the process periphery,
    and wherein the active central computer transmits a sign-of-life message to the passive central computer, preferably periodically,
    and wherein the passive central computer acknowledges the receipt of a sign-of-life message from the active central computer in a periodic sign-of-life message and monitors it through a time-out, and wherein the passive central computer assumes the role of the active central computer if the sign-of-life messages fail to appear after the time-out,
    and wherein the faulty, previously active central computer autonomously attempts to restart and, following a successful restart, monitors the communications traffic within a cluster, the cluster containing the central computer, in order to ascertain the current status of the cluster, and wherein the computer assumes the role of the passive central computer and informs the now-active central computer by means of preferably periodic sign-of-life messages that it is performing the role of the passive central computer, and wherein, if the restart is unsuccessful, the faulty central computer is configured to indicate a permanent error, e.g. by means of a display means, such as in the form of an indicator light.

Furthermore, the aforementioned problem is solved by an aforementioned automation system, in which, according to the invention,
    the central computers are fail-silent FCUs and represent autonomous exchange units, and
    the multitude of gateway computers are fail-silent FCUs and represent autonomous exchange units, wherein
    the central computers and the gateway computers exchange timed status messages via communication channels, preferably via wireless and in particular local wireless communication channels, and wherein each gateway computer establishes the link to the process periphery associated with the gateway computer and saves the current status of the process periphery associated with the gateway computer,
    wherein one of the at least two central computers assumes the role of an active central computer and at least one other central computer of the at least two central computers assumes the role of a passive central computer, and wherein
    the active central computer exerts control over the gateway computers,
    and wherein the active central computer transmits a sign-of-life message to the passive central computer, preferably periodically,
    and wherein the passive central computer acknowledges the receipt of a sign-of-life message from the active central computer in a periodic sign-of-life message and monitors it through a time-out, and wherein the passive central computer assumes the role of the active central computer if the sign-of-life messages fail to appear after the time-out,
    and wherein the faulty, previously active central computer autonomously attempts to restart and, following a successful restart, monitors the communications traffic within a cluster, namely the cluster containing the central computer and the gateway computers, in order to ascertain the current status of the cluster, and wherein the computer assumes the role of the passive central computer and informs the now-active central computer by means of preferably periodic sign-of-life messages that it is performing the role of the passive central computer, and wherein, if the restart is unsuccessful, the faulty central computer is configured to indicate a permanent error, e.g. by means of a display means, such as in the form of an indicator light.

The present invention describes a fault-tolerant architecture for an automation system which is distinguished by particularly simple maintainability. The essential functions of the system are maintained even after a fault occurs, and the identification and replacement of the faulty unit can be undertaken by an untrained layperson. If a component is permanently faulty, a redundant component assumes the function of the faulty component and reports the detected failure. A layperson can recognize the faulty component (e.g. permanently malfunctioning central computer) from a display means, e.g. an unusual warning light/indicator light, and must merely install a new functional component in its place in order to re-establish the redundancy. Since all connections are preferably wireless and the new component is autonomously integrated into the application, no further maintenance activity is required.

One of the advantages of the present invention is that the automation system is configured out of autonomous replicated fail-silent FCUs (fault containment units), which continuously perform self-analysis, autonomously redress transient sources of errors and autonomously implement the integration of new hardware in addition to their prescribed function. Preferably, a wireless connection technology is used which makes it possible to replace a faulty FCU without having to disconnect mechanical connections. Every fail-silent FCU, which also represents an exchange unit, is provided with a display means that displays whether the FCU is functioning or must be replaced.

For example, the process periphery includes all of the devices and systems that are to be controlled in a house, e.g. a single-family house, such as the alarm system, heating, shutters, lights, etc. This list is given only as an example and is not exhaustive.

In a first variant described above, the active central computer communicates directly with the process periphery. This embodiment is appropriate when all of the devices, systems, etc. of the process periphery can communicate with the central computer via a standard protocol.

However, there is generally no standard protocol of this type for all devices, systems, etc. of the process periphery, and in such cases it is advantageous to select the second variant, in which the central computers communicate with gateway computers and the gateway computers, in turn, communicate with the process periphery. In this way, each of the gateway computers can be linked with exactly one device or system of the process periphery, but it is also possible that one or more gateway computers are linked with two or more devices/systems, etc. of the process periphery.

None of the known patents [1-3] or the searched technical literature anticipates the proposed invention.

Preferred embodiments of the claimed automation system, which can be implemented individually or in any desired combination, are described below:

a central computer is configured to monitor the communications traffic within the cluster after power-up in order to determine a cluster identifier, wherein an initialization state associated with the cluster identifier is subsequently downloaded from a cloud or a memory medium, and wherein the communications traffic within the cluster is monitored after the successful start-up of the preferably new central computer in order to ascertain the current status of the cluster, and wherein the new central computer assumes the role of the passive central computer from then on and informs the active central computer by means of preferably periodic sign-of-life messages that it is performing the role of the passive central computer;

the central computers and/or the gateway computers have access to a global time;

the central computer that assumes the role of the active central computer after the time-out assumes control over the process periphery and the gateway computers;

the sign-of-life messages sent by the central computer contain a unique identifier for the central computer transmitting them;

when two central computers power up simultaneously, the central computer with the smaller identifier assumes the role of the active central computer;

a data field containing a unique identifier of the cluster identity is included in the payload of the internal cluster messages;

a central computer exchanges the messages with its environment in the cluster, i.e. at least with the at least one further central computer and/or at least with the gateway computers, via a Bluetooth communications system;

a central computer exchanges the messages with its environment in the cluster, i.e. at least with the at least one further central computer and/or at least with the gateway computers, via a WiFi communications system;

a central computer exchanges the messages with its environment in the cluster, i.e. at least with the at least one further central computer and/or at least with the gateway computers, via a ZigBee communications system;

each central computer has its own power supply, advantageously with an energy storage system;

a central computer is supplied with energy via an inductive power supply;

a or the gateway computer(s) is/are replicated;

the content of the messages wirelessly transmitted in the automation system is encrypted cryptographically.

It is an advantage for an automation system of this type to have a central computer containing a host computer and a monitor computer, wherein the monitor computer monitors the correct function of the host computer and triggers a restart of the host computer in the event of a fault.

The central computer preferably has a communications controller for the WiFi communications system.

The central computer preferably has a communications controller for the Bluetooth communications system.

The central computer preferably has a communications controller for the ZigBee communications system.

The central computer preferably has a receiver for a GPS signal.

The central computer preferably has a receiver for the DCF77 signal.

Preferably, a display means is located on the central computer, such as in the form of an indicator light, which indicates e.g. by continuous illumination that the central computer is functional and in the active state.

Preferably, a display means is located on the central computer, such as in the form of an indicator light, which indicates e.g. by blinking that the central computer is functional and in the passive state.

The central computer can preferably download from a cloud the data structure that describes its initialization state.

The central computer preferably establishes a wireless data link to the telephone network via a SIM card.

The central computer can preferably install the data structure describing its initialization state from a USB memory device.

It is an advantage for an automation system such as this to have a gateway computer that is configured to send a periodic status message to the central computer, the content of which indicates the current state of the process periphery associated with the gateway computer.

The gateway computer is preferably configured to download the data structure describing its initialization state from a cloud.

The gateway computer is preferably configured to establish a wireless data link to the telephone network via a SIM card.

The gateway computer is preferably supplied with energy via an inductive power supply.

The gateway computer preferably transforms event messages from the process periphery into status messages for the central computer and status messages from the central computer into event messages for the process periphery.

The gateway computer preferably has a display means, such as in the form of an indicator light, to indicate the functionality of the gateway computer, wherein the functionality is indicated e.g. in the form of continuous illumination of the indicator light.

Definitions

The following section explains new terms that are used in the description of the invention and which go beyond the standard terms in real-time processing, such as those used in textbook [8].

The term cluster is understood to mean the entirety of the central computer and optionally the gateway computers that form the control center of the automation system. These central computers and optionally gateway computers are typically located in physical proximity to each other.

A cluster has a unique identifier when a bit vector from which the physical identity of the cluster emerges is allocated to the cluster.

A central computer is a computer with a memory in which the application programs of the automation system run and the data of the automation system are stored.

A gateway computer is a computer which establishes the connection between the cluster and the process periphery 13 which is typically arranged remotely—and which stores the status of the process periphery. If the central computers communicate directly with the process periphery, then the status of the process periphery is stored in at least one or more of the central computers, preferably in the active central computer.

The process periphery associated with a gateway computer (or a central computer) comprises the entirety of the sensors that are read out by the gateway computer (or the central computer) and the entirety of the actuators for which the gateway computer (or the central computer) can provide a setpoint value. The connection between a gateway computer (or central computer) and the process periphery associated with the gateway computer (or central computer) can be established via a wired or wireless communications channel.

A central computer is active when it exerts control over the gateway computers, i.e. when it provides setpoint values for the process periphery associated with the gateway computers or when it exerts control or supervision over the process periphery.

A central computer is passive when it does not exert control over the gateway computers (or does not exert control/supervision over the process periphery).

A computer has a unique identifier when a bit vector is allocated to the computer from which the physical identity of the computer emerges.

A fail-silent FCU is a computer that either functions properly or does not perform any tasks, i.e. is silent in the event of a fault. The fail-silent property can be achieved by the known practice of redundancy [4]. The failure of a fail-silent FCU can be detected only in the time domain. Within the context of the present invention, a fail-silent computer is also an exchange unit.

A computer is an autonomous exchange unit when the computer can be exchanged in the field and can perform the following functions independently (i.e. without human intervention):

Detection of a fault
Deciding whether the cause of the fault is transient or permanent
Redressing the consequences of a transient fault
Downloading the initialization state
Integrating into ongoing operations.

The initialization state of a computer is a static data structure which comprises the entirety of the programs and initialization data that must be present in the hardware before the computer can begin with the execution of its assigned functions.

The current status of a computer comprises all dynamic data from the past which are significant to the future behavior of the computer (see [8], p. 84).

The payload of a message is understood to mean the bit vector that is transported in the data field of the message.

A timed status message is a periodic message which is sent at a priori known points in time, wherein a new version of the message overwrites the old version upon receipt and the message is not consumed upon transmission ([8], p. 91).

A sign-of-life message is a periodic message which is sent by a computer and from whose content it can be discerned whether the computer is functioning properly.

Bluetooth is an industry standard (IEEE Standard 802.15.1) for data transmission between devices over a short distance by radio technology (WPAN) with a bandwidth of up to 2.1 Mbit/second.

WiFi is an industry standard (IEEE Standard 802.11) for data transmission between devices over a medium distance by radio technology with a bandwidth of up to 150 Mbit/second.

The GPS signal is a satellite signal available worldwide which relays the progression of physical time with an accuracy of better than 100 nsec.

The DCF77 signal is a radio signal available in Europe which relays the progression of physical time with an accuracy of ca. 1 msec.

NTP (Network Time Protocol) is a protocol that distributes time via the Internet with an accuracy of ca. 1 msec.

An inductive power supply is a wireless energy supply based on the known principle of induction.

Hereafter the invention is discussed in terms of the drawing. The following is shown:

FIG. 1 a cluster of a claimed automation system, and

Figure 2:
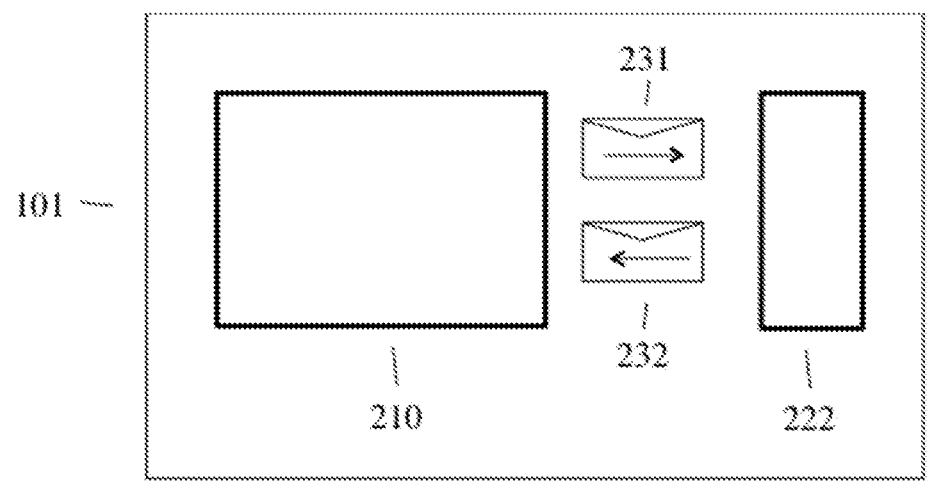

FIG. 2 the internal structure of a central computer.

One of the many possible concrete implementations of the invention will be described below on the basis of FIG. 1. An IoT (Internet of Things) system for controlling devices in a single family house is used as an example.

FIG. 1 shows a claimed automation system. It includes a cluster, which is represented by the content of rectangle 100. Within the cluster are the two central computers 101 and 103 and the five gateway computers 111, 112, 113, 114 and 115.

The gateway computers 111, 112, 113, 114 and 115 establish the link between the cluster 100 and the proprietary process periphery (not shown) via e.g. non-standardized radio connections or wire-bound connections. The gateway computers send periodic status messages to the central computers, the content of which indicates the current status of the process periphery associated with a gateway computer. In order to reduce the effort required for communications between the gateway computer and the process periphery, it may be appropriate for the gateway computer to transform event messages (see [8], p. 90) from the process periphery into status messages for the central computer and status messages from the central computer into event messages for the process periphery.

It is assumed in the concrete example that the following devices of the automation system make up the process periphery and are connected to the cluster:

| Device | Gateway Computer | Connection |
|---|---|---|
| Alarm System | 111 | 121 |
| Heating | 112 | 122 |
| Shutters | 113 | 123 |
| Lighting | 114 | 124 |
| Telephone network via SIM card | 115 | 125 |

The central computers and the gateway computers communicate by means of messages via a wireless communications system, e.g. via Bluetooth or WiFi. Since these messages are exchanged wirelessly, both central computer 101 and central computer 103 can exert control over the process periphery.

It is advantageous to encrypt the messages, the payload, cryptographically.

A data field containing a unique identifier of the cluster identity is included in the payload of the internal cluster messages.

Advantageously, each central computer has its own power supply with an energy storage system, which contactlessly transfers energy to the central computer via an inductive coupling. Since all of a central computer's connections to its environment can be realized without direct mechanical contact, a defective central computer can be replaced simply by installing a new central computer.

If the process periphery of the central computer can be directly accessed by standard protocols, such as by the WiFi protocol, then it is not necessary to activate a gateway computer.

After the power-up, the two redundant central computers 101 and 103 set themselves in the passive state and let the indicator lights 102 and 104 blink, and each sends the other central computer a sign-of-life message 131 and 132 containing the unique identifier of the central computer. The exact time is adopted from the NTP Protocol [5], the DCF77 signal or the GPS signal. The central computers compare the two identifiers. The central computer with the smaller identifier sets itself in the active state and assumes control over the gateway computers. The active central computer, e.g. central computer 101, then illuminates its indicator light 102 continuously to indicate that it is exerting control in the cluster 100. The other central computer, central computer 102, continues blinking in the passive state.

It is assumed in the following section that central computer 101 is in the active state. The inner structure of central computer 101 is sketched out in FIG. 2. The central computer consists of a host computer 210 and a monitor computer 222, which exchange line-connected messages 231 and 232. The monitor computer 222 monitors the event messages 231 received by the host computer 210. If the monitor computer 222 detects a fault, then the monitor computer 222 forces the hardware of the host computer 210 into the reset state by means of a message 232, and the transmission of the sign-of-life message 131 (FIG. 1) is interrupted. The central computer 103 that is passive at this point detects the absence of the sign-of-life message 131 through a time-out and switches to the active state. Since communications between the host computer 101 and 103 and the gateway computers 111, 112, 113, 114 and 115 are conducted via timed status messages, the host computer 103 can assume control over the cluster 100 without interrupting operations.

The central computer 101 that has been forced into the reset status then autonomously attempts to restart. Since the most common causes of faults are of a transient nature, the restart is successful in most cases. (When the cause of the fault is transient, a data structure within the central computer 101 is corrupted, but the hardware of the central computer 101 remains undamaged.) Subsequently, the central computer 101 monitors the communications traffic within the cluster in order to ascertain the current status of the cluster and from then on assumes the role of the passive central computer. It informs the now-active central computer 103 by means of the periodic sign-of-life message 131 that central computer 101 is performing the role of the passive central computer from then on.

If the restart is unsuccessful, the monitor computer 210 deactivates the indicator light 102 of the faulty central computer to indicate a permanent error in the central computer 101. To re-establish redundancy, the faulty central computer 101 must be replaced by a new central computer. This can be carried out by a user of the automation system, for example. Once the new central computer 101 has arrived and been set up, the new central computer executes the power-up and monitors the communications traffic within the cluster in order to determine the unique cluster identifier. The cluster identifier is the initialization state (which are the programs and data that must be installed in a new central computer so that it can carry out its installation-specific function) of the central computer in this installation or in this automation system. The identified initialization state is then downloaded from a cloud or a storage medium (such as a USB memory device). Following the successful restart of the new central computer 101 with the relevant initialization state, the communications traffic within the cluster is monitored in order to ascertain the current status of the cluster 100. From then on, the new central computer 101 assumes the role of the passive central computer and informs the active central computer 103 by means of preferably periodic sign-of-life messages 131 that it will henceforth perform the role of the passive central computer 101.

According to the invention, more than one passive central computer can be present in a cluster 100 in addition to one active central computer. It is also possible to replicate the gateway computers.

The connection to the telephone network can be established either via the gateway computer 115 or directly via the central computers. Should redundancy be required, the connection is preferably established by the central computer, e.g. with a SIM card in each of the central computers.

Man-machine communications between the automation system (the central computer) and a user preferably occur by means of a tablet computer or a smartphone.

The present example demonstrates one of the many possible applications of the claimed fault-tolerant, serviceable automation system.

It is possible to standardize the hardware of the central computer by the preferred adoption of a standardized, timed wireless message interface between the central computers and the gateway computers and by the physical separation of the gateway computers that establish the connection with specific devices and with the proprietary process periphery. This kind of standard product is manufactured in large quantities and can accordingly be produced cost-effectively.

CITED LITERATURE

[1] U.S. Pat. No. 8,312,318. Graham et al.: System and Methods of high availability Cluster Environment Failover Protection. Granted Nov. 13, 2012.
[2] U.S. Pat. No. 8,745,467. Gale et al.: System and Method for Fault-Tolerant Computing Using Generic Hardware. Granted Jun. 3, 2014.
[3] US Patent Application 20030135790. Pignol, M.: Computer System that tolerates Transient Errors and Method for Management in a System of this Type. Jul. 17, 2003.
[4] Mahmud, A.: Concurrent Error Detection Using Watchdog Processors—A Survey. IEEE Trans. on Computers. Vol 37. No. 2, February 1988
[5] NTP. Network Time Protocol. Wikipedia, 2014.

[6] IEEE Standard 802.11. Wireless LANs. URL: standards.ieee.org.
[7] IEEE Standard 802.15.1. Bluetooth. URL: standards.ieee.org.
[8] Kopetz, H. Real-Time Systems, Design Principles for Distributed Embedded Applications. Springer Verlag. 2011.

The invention claimed is:

1. A fault-tolerant, maintainable automation system comprising:
at least two central computers; and
a process periphery that is remote from the at least two central computers, wherein the at least two central computers are configured to communicate with and/or control the process periphery,
wherein the at least two central computers are fail-silent fault containment units (FCUs) and represent autonomous exchange units,
wherein a first central computer of the at least two central computers is configured to initially assume a role of an active central computer and a second central computer of the at least two central computers is configured to initially assume a role of a passive central computer,
wherein the role of the active central computer includes:
carrying out communications with and/or controlling the process periphery,
exchanging timed status messages via one or more local wireless communication channels with the process periphery, and saving a current status of the process periphery, and
periodically transmitting at least one sign-of-life message to the passive central computer on a first local wireless communication channel of the one or more local wireless communication channels, and
wherein the role of the passive central computer includes:
acknowledging a receipt of a first sign-of-life message of the at least one sign-of-life messages from the active central computer in a second sign-of-life message sent to the active central computer and monitoring the one or more local wireless communication channels for a time-out period, and
wherein the second central computer is configured to assume the role of the active central computer if the second central computer does not receive a sign-of-life message from the first central computer during the time-out period, and
wherein the first central computer is configured to autonomously attempt to restart and, following a successful restart, is configured to monitor communications traffic within a cluster, the cluster comprising the first central computer, in order to ascertain a current status of the cluster, and
wherein the first central computer assumes the role of the passive central computer and informs the second central computer, which assumed the role of the active central computer, that the first central computer is performing the role of the passive central computer, and
wherein, if the restart is unsuccessful, the first central computer is configured to indicate a permanent error.

2. The automation system of claim 1, wherein one or more of the at least two central computers is configured to monitor the communications traffic within the cluster after power-up in order to determine a cluster identifier and/or the current status of the cluster,
wherein an initialization state associated with the cluster identifier is subsequently downloaded from a cloud or a memory medium, and
wherein the communications traffic within the cluster is monitored after the successful start-up of the first central computer in order to ascertain the current status of the cluster.

3. The automation system of claim 1, wherein the at least one sign-of-life messages sent by the first central computer includes a first unique identifier for the first central computer, and/or the at least one sign-of-life messages sent by the second central computer includes a second unique identifier for the second central computer.

4. The automation system of claim 1, wherein the first and second central computers power up simultaneously, and the first central computer is associated with a smaller identification number than the second central computer.

5. The automation system of claim 1, wherein at least one of the at least two central computers is configured to communicate via Bluetooth.

6. The automation system of claim 1, wherein at least one of the at least two central computers is configured to communicate via WiFi.

7. The automation system of claim 1, wherein at least one of the at least two central computers is configured to communicate via ZigBee.

8. The automation system of claim 1, wherein each of the at least two central computers has its own power supply, advantageously with an energy storage system.

9. The automation system of claim 1, wherein at least one of the at least two central computers is supplied with energy via an inductive power supply.

10. The automation system of claim 1, wherein communications, including at least sign-of-life messages, are encrypted.

11. The automation system of claim 1, wherein the at least two central computers comprise a host computer and a monitor computer, wherein the monitor computer monitors for correct function of the host computer and triggers a restart of the host computer if a fault occurs in the host computer.

12. The automation system of claim 11, wherein the at least two central computers comprise a communications controller for a WiFi communications system.

13. The automation system of claim 11, wherein the at least two central computers comprise a communications controller for a Bluetooth communication system.

14. The automation system of claim 11, wherein the at least two central computers comprise a communications controller for a ZigBee communication system.

15. The automation system of claim 11, wherein the at least two central computers comprise a receiver for a GPS signal.

16. The automation system of claim 11, wherein the at least two central computers comprise a receiver for a DCF77 signal.

17. The automation system of claim 11, wherein the at least two central computers comprise a display indicating, through a continuous illumination, that the at least two central computers are functional and in an active state.

18. The automation system of claim 11, wherein the at least two central computers comprise a display indicating, through a blinking illumination, that the at least two central computers are functional and in a passive state.

19. The automation system of claim 11, wherein the at least two central computers are configured to download from a cloud a data structure that describes an initialization state.

20. The automation system of claim 11, wherein the at least two central computers are configured to establish a wireless data link to a telephone network via a SIM card.

21. The automation system of claim 11, wherein the at least two central computers are configured to load a data structure describing an initialization state from a USB memory device.

22. The automation system of claim 1, wherein the first central computer indicates a permanent error through an indicator light.

23. A fault-tolerant, maintainable automation system comprising:
- at least two central computers;
- a process periphery that is remote from the at least two central computers; and
- one or more gateway computers,
- wherein the at least two central computers are fail-silent fault containment units (FCUs) and represent autonomous exchange units, and
- wherein the one or more gateway computers are fail-silent FCUs and represent autonomous exchange units,
- wherein the at least two central computers and the one or more gateway computers are configured to exchange timed status messages via one or more local wireless communications channels, and
- wherein a first gateway computer of the one or more gateway computers is associated with the process periphery, and is configured to establish a link with the process periphery and save a current status of the process periphery, and
- wherein a first central computer of the at least two central computers is configured to initially assume a role of an active central computer and a second central computer of the at least two central computers is configured to initially assume a role of a passive central computer,
- wherein the role of the active central computer includes:
  - exerting control over the one or more gateway computers, and
  - transmitting at least one sign-of-life message to the passive central computer on a first local wireless communication channel of the one or more local wireless communication channels, and
- wherein the role of the passive central computer includes:
  - acknowledging a receipt of a first sign-of-life message of the at least one sign-of-life messages from the active central computer in a second sign-of-life message sent to the active central computer and monitoring the one or more local wireless communication channels for a time-out period, and
- wherein the second central computer is configured to assume the role of the active central computer if the second central computer does not receive a sign-of-life message from the first central computer during the time-out period,
- wherein the first central computer is configured to autonomously attempt to restart and, following a successful restart, monitor the communications traffic within a cluster containing the first central computer and the one or more gateway computers, in order to ascertain a current status of the cluster, and
- wherein the first central computer is configured to assume the role of the passive central computer and to inform the second central computer, which assumed the role of the active central computer, that the first central computer is performing the role of the passive central computer, and
- wherein, if the restart is unsuccessful, the first central computer is configured to indicate a permanent error.

24. The automation system of claim 23, wherein the at least two central computers and/or the one or more gateway computers have access to a global time.

25. The automation system of claim 23, wherein the second central computer, after assuming the role of the active central computer after the time-out period, is configured to then assume control over the process periphery and the one or more gateway computers.

26. The automation system of claim 23, wherein a data field containing a unique identifier of a cluster identity is included in a payload of internal cluster messages from one of the one or more gateway computers to at least one of the at least two central computers.

27. The automation system of claim 23, wherein at least one of the one or more gateway computers is replicated.

28. The automation system of claim 23, wherein the one or more gateway computers sends a periodic status message to the at least two central computers, wherein the periodic status messages indicate the current state of the process periphery.

29. The automation system of claim 28, wherein the one or more gateway computers is configured to download a data structure describing an initialization state from a cloud.

30. The automation system of claim 28, wherein the one or more gateway computers is configured to establish a wireless data link to a telephone network via a SIM card.

31. The automation system of claim 28, wherein the one or more gateway computers are supplied with energy via an inductive power supply.

32. The automation system of claim 28, wherein the one or more gateway computers is configured to transform event messages from the process periphery into status messages for the at least two central computers and status messages from the at least two central computers into event messages for the process periphery.

33. The automation system of claim 28, wherein the one or more gateway computers comprise a display indicating, through a blinking illumination, that the one or more gateway computers are functional and in a passive state.

34. The automation system of claim 23, wherein the first central computer indicates a permanent error through an indicator light.

* * * * *